United States Patent
Pelaez et al.

(10) Patent No.: US 6,870,905 B2
(45) Date of Patent: Mar. 22, 2005

(54) WIRETAP IMPLEMENTED BY MEDIA GATEWAY MULTICASTING

(75) Inventors: Mariana Benitez Pelaez, Naperville, IL (US); Keiko Katagiri, Naperville, IL (US); Dipak V. Patel, Hoffman Estates, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 74 days.

(21) Appl. No.: 10/602,961

(22) Filed: Jun. 24, 2003

(65) Prior Publication Data

US 2004/0185836 A1 Sep. 23, 2004

Related U.S. Application Data

(60) Provisional application No. 60/451,764, filed on Mar. 4, 2003.

(51) Int. Cl.[7] .......................... H04M 1/24; H04B 17/00
(52) U.S. Cl. ........................................ 379/35; 455/67.2
(58) Field of Search .......................... 379/32.01, 32.02, 379/32.03, 32.05, 35, 207.01, 211.01, 211.02; 455/417, 9, 67.2

(56) References Cited

U.S. PATENT DOCUMENTS

| | | | |
|---|---|---|---|
| 2002/0009973 A1 * | 1/2002 | Bondy et al. | 455/67.2 |
| 2004/0120494 A1 * | 6/2004 | Jiang et al. | 379/210.01 |
| 2004/0203798 A1 * | 10/2004 | Bedingfield | 455/445 |

* cited by examiner

*Primary Examiner*—Rexford Barnie

(57) ABSTRACT

Media gateways operate under the control of an intelligent node or switch associated with a wiretap party and are configured on a per call basis to establish multicasting communication links to law enforcement authorities while simultaneously supporting the end-to-end telephony services elected by the calling and/or called party. The multicasting communication links supply law enforcement authorities with communications generated by the calling party and the terminating party.

6 Claims, 4 Drawing Sheets

WIRETAP IMPLEMENTED BY MEDIA GATEWAY MULTICASTING

This application claims the benefit of provisional application No. 60/451,764, filed Mar. 4, 2003.

BACKGROUND

This invention is generally directed to the implementation of a wiretap (a legally authorized interception of communications) and is more specifically directed to the use multicasting by a media gateway to facilitate wiretaps including, but not limited to, situations in which the wiretap party employs enhanced telephony services such as call forwarding.

The use of conventional wiretaps by law enforcement authorities is well-known. In its most basic form, a wiretap can be accomplished by a splice of a wire telephone line used by the wiretap party where the splice consists of a parallel telephone line connected to a telephone and/or recording device operated by law enforcement authorities. With the evolution of more sophisticated telephony equipment and services, providing facilities to accommodate a legally authorized interception of communications to and from a wiretap party has become increasingly difficult. For example, cellular telephone subscribers may place and receive telephone calls from different locations that are supported by different infrastructure equipment. Advanced call services such as three-way conferencing and call forwarding provide varied circumstances that need to be addressed to support a comprehensive wiretapping capability. Thus, there exists a need for improved wiretap support capability.

SUMMARY OF THE INVENTION

It is an object to the present invention to provide an improved wiretap support capability that is suited, but not exclusively suited, for use in wireless telephony environments where call forwarding services may be elected.

In an embodiment of the present invention, media gateways operate under the control of an intelligent node, e.g. a switch, associated with a wiretap party and are configured on a per call basis to establish multicasting communication links to law enforcement authorities while simultaneously supporting the end-to-end communications sought in accordance with the telephony services elected by the calling and/or called party. The multicasting communication links provide the means of supplying law enforcement authorities with communications generated by the calling party and the terminating party.

DETAILED DESCRIPTION

Figure 1:
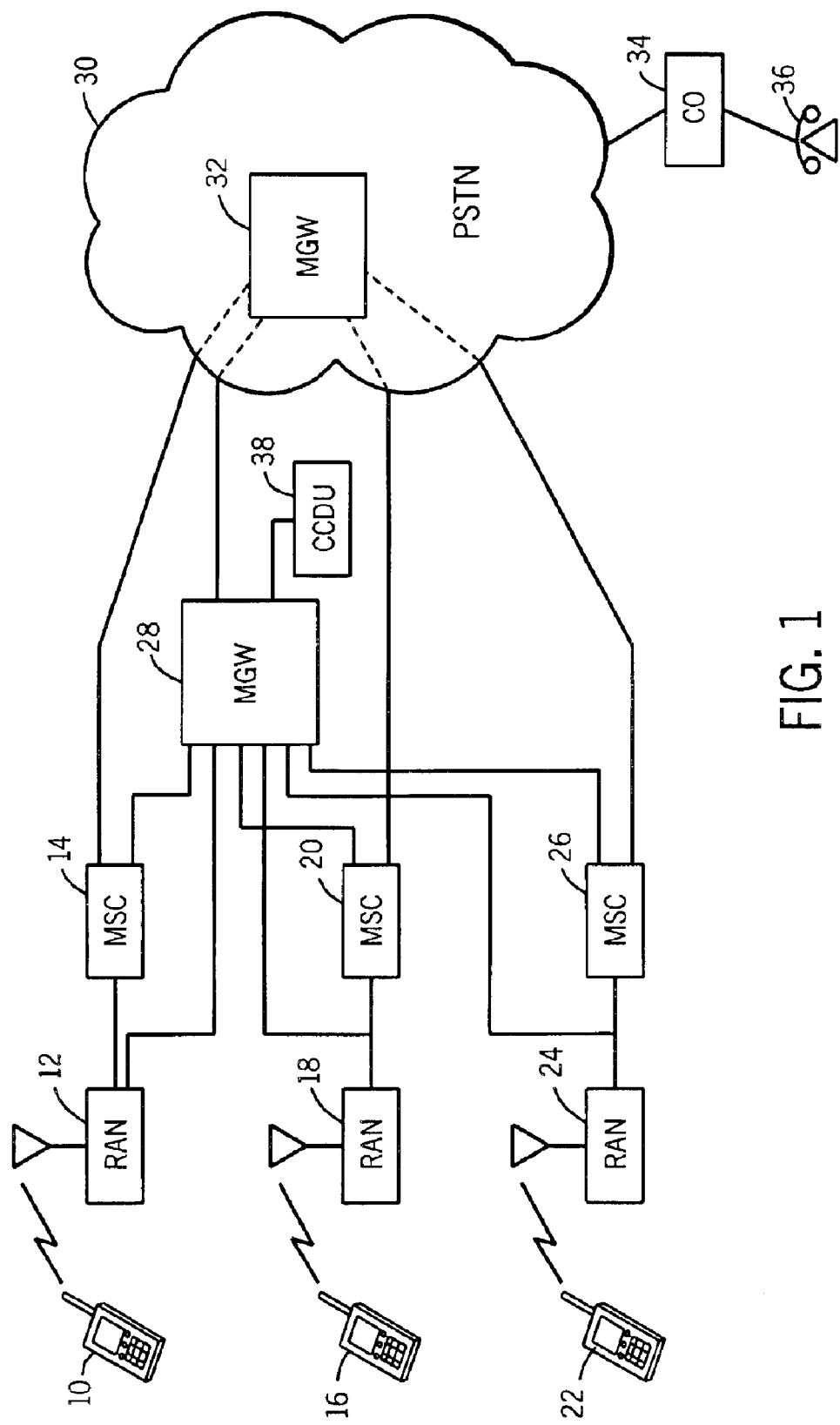
FIG. 1 is a block diagram of a telecommunication network that incorporates an embodiment of the present invention.

The exemplary network shown in FIG. 1 supports an embodiment of the present invention. A subscriber associated with wireless communication device 10, such as a cellular telephone, is supported with wireless telecommunications by radio access network (RAN) 12 and mobile switching center (MSC) 14. Similarly, subscribers associated with wireless communication devices 16 and 22 are supported with wireless telecommunications by radio access networks 18 and 24 and mobile switching centers 20 and 26, respectively. A media gateway (MGW) 28, such as a Cisco Systems Inc. MGX-8850 multiservice switch, is connected to the RANs, mobile switching centers 14, 20 and 26, and to the public switched telephone network (PSTN) 30 that includes media gateway (MGW) 32. A central office telecommunications switch 34 is also coupled to the PSTN 30 and supports a telephone line connected to telephone 36. A call collection data unit (CCDU) 38 connected to MGW 28 receives and stores communications associated with party subject to the wiretap.

In accordance with an embodiment of the present invention, a wiretap as will be explained below is supported by the network shown in FIG. 1. The subscriber associated with the wireless device and the wireless device itself will be referred to by the reference numeral associated with the wireless device; it will be apparent from the context whether the subscriber or the device is intended. In an illustrative example, law enforcement authorities associated with telephone 36 have obtained legal authority to intercept and record communications to and from subscriber 16. The law enforcement authorities have contacted the telecommunications service provider for subscriber 16 and requested that calls to and from the telephone number associated with subscriber 16 be intercepted and that any communications resulting from such calls be routed to and stored in CCDU 38. It is also requested that all calls intended for subscriber 16 be intercepted even where enhanced telecommunication services are utilized for subscriber 16 to reroute an incoming call, such as by utilizing call forwarding, to another telephone number. Assume that the telecommunications service provider has taken steps in accordance with the present invention as will be described below to carry out these requests.

Assume subscriber 10 places a telephone call to subscriber 16. Prior to this incoming telephone call, subscriber 16 has enabled unconditional call forwarding of all incoming calls and directed that all such calls be routed to subscriber 22. The subscriber 16 may desire that all calls be directed for answering by the subscriber normally associated with telephone 22 or may anticipate himself using telephone 22 to receive incoming calls originally directed to telephone 16. Regardless of the motive, call forwarding has been initiated to reroute calls from telephone 16 to telephone 22. The handling of such calls that are subject to a wiretap of the subscriber's telephone 16 as will be described below.

Figure 2:
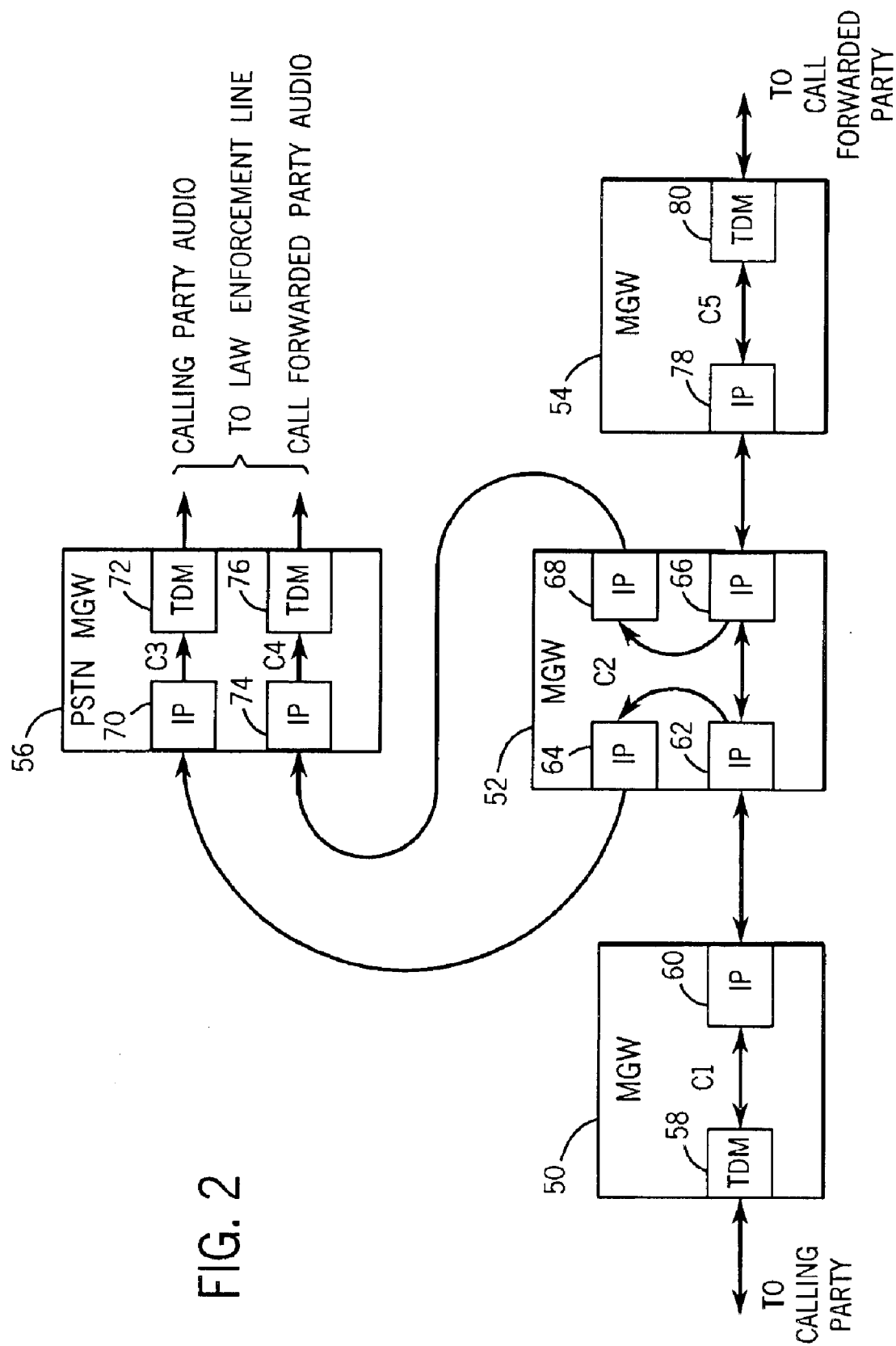
FIG. 2 is a logical diagram illustrating communication paths created through the media gateways in accordance with an embodiment of the present invention.

Before beginning a description of the exemplary steps utilized to connect such a call including the wiretap implementation to monitor the call, an overview of FIG. 2 will be of assistance. Logical media gateway elements 50, 52 and 54 could be realized in physically separate media gateway nodes but in the illustrative embodiment are implemented within MGW 28. Logical media gateway element 56 is implemented as part of MGW 32 that is part of the PSTN 30. The media gateways 28 and 32 contain a plurality of input/output ports, including ports that support time division multiplex (TDM) communications and packet based Internet protocol communications. In accordance with ITU-T H.248 standards these ports can be interconnected in accordance with requests received from an intelligent node, e.g. MSC 20, to form a logical network. In accordance with this embodiment these ports are configured on a per call request. Further details concerning FIG. 2 will be provided as part of the discussion of the exemplary flow diagram.

Figure 3:
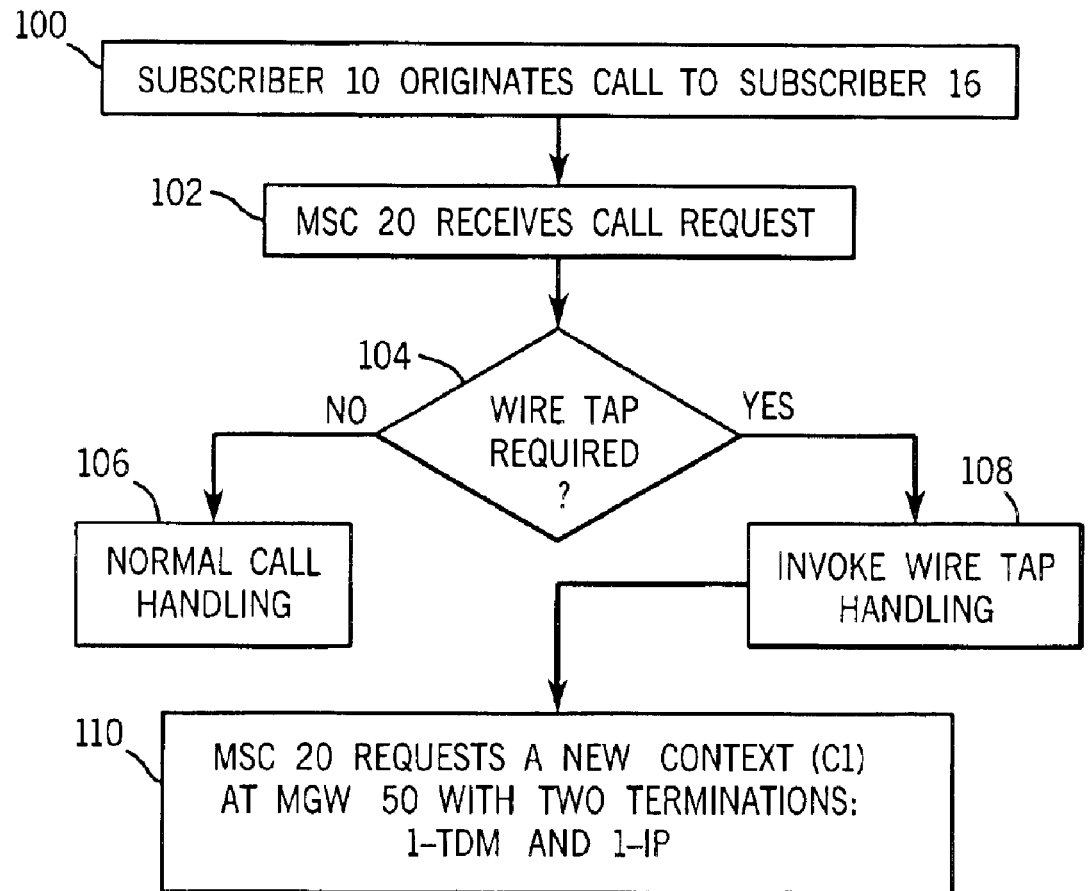
FIGS. 3 and 4 show a flow diagram illustrating steps in accordance with an exemplary method of the present invention.
Figure 3:
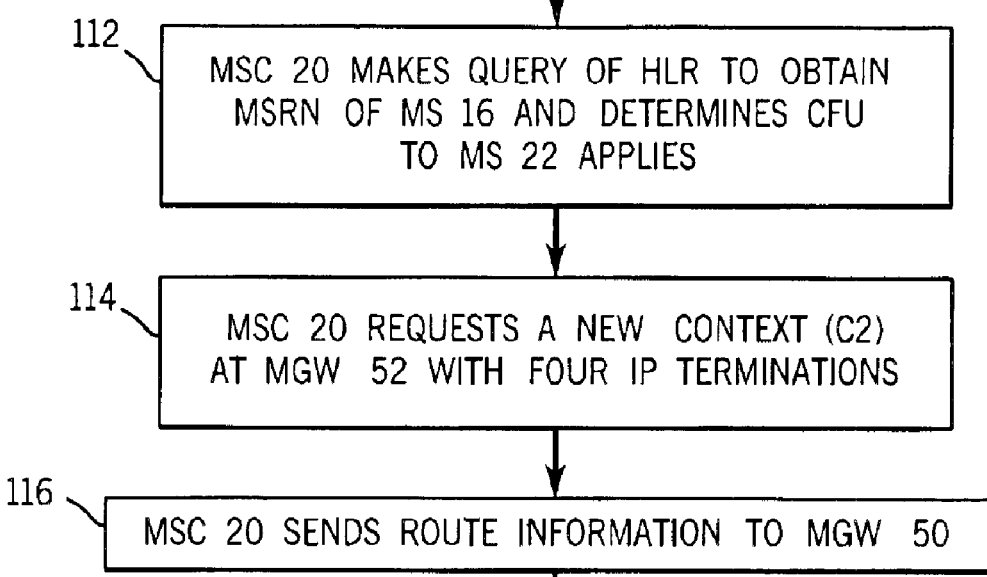
Figure 4:
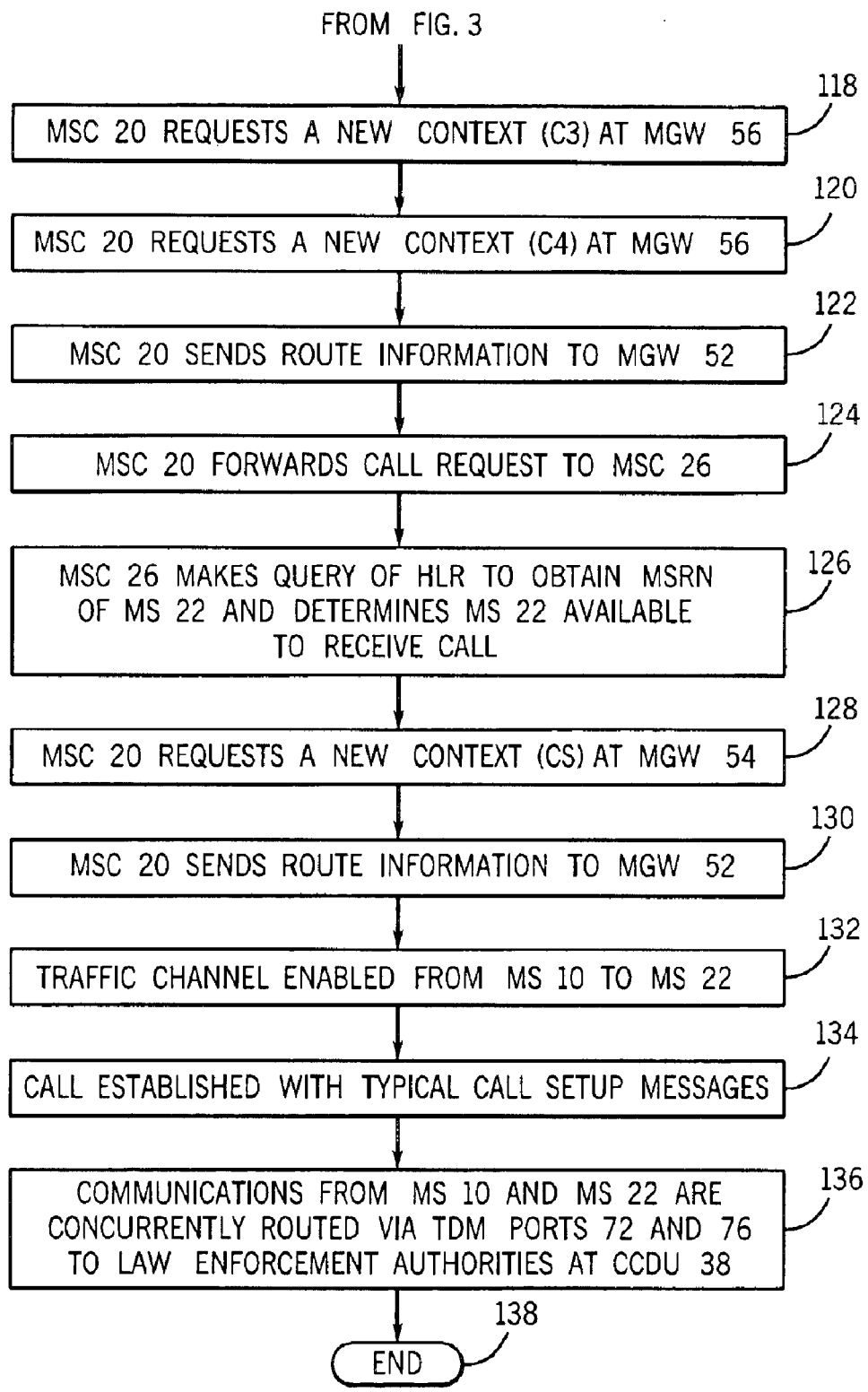

Referring to FIGS. 3 and 4, the flow diagram illustrates the handling of a call from subscriber 10 to subscriber 16 where subscriber 16 has unconditional call forwarding activated to telephone 22 and the call is forwarded without being offered to telephone 16. Subscriber 16 is the target of an interception of communications by law enforcement authorities in which communications to and from telephone 16 are to be routed to telephone 36; therefore, this call must be tapped.

In step 100 subscriber 10 originates a call to subscriber 16 by dialing the corresponding telephone number of subscriber 16 and requests the establishment of the call by radio access network 12 and mobile switching center 14. Following normal authentication and security procedures, the call request is relayed to mobile switching center 20 in step 102. The MSC 20 is the terminating MSC for subscriber 16. In step 104 a determination is made of whether a wiretap is required. A NO determination by step 104 results in the call request being subject to normal call handling procedures at step 106. A YES determination by step 104 results in the MSC 20 utilizing wiretap handling call procedures at step 108 as will be explained.

Having determined that wiretap procedures are to be utilized, MSC 20 requests a new context (C1) at logical media gateway 50 (MGW 28) in step 110. This request is accomplished by sending H.248 Add commands indicating the assignment of two terminations: TDM termination 58 and IP termination 60. The TDM termination 58 is coupled to the calling party's (subscriber 10) communication channel and the IP termination 60 is a network facing termination. The logical MGW 50 connects the TDM termination 58 and the IP termination 60, and provides the appropriate protocol interface to facilitate TDM information to be translated into IP packets and vice versa. The logical MGW 50 returns a transaction reply to MSC 20 that includes a context identification, C1, and the associated IP address and port number of IP termination 60 to support real-time packet transmission. This completes the configuration of logical MGW 50.

In step 112, the MSC 20 queries the home location register (HLR) to obtain the mobile station routing number (MSRN) of telephone 16 and determines that call forwarding unconditional (CFU) is active and that the call is to be forwarded to subscriber telephone 22. In step 114 the MSC 20 creates a new context C2 to facilitate the wiretap. The MSC 20 requests a new context C2 at logical MGW 52 creating four new IP terminations 62, 64, 66, and 68. The logical MGW 52 returns to MSC 20 a context identification, C2, and the allocated IP address and port numbers for each termination. In the initial request from MSC 20 for a new context C2: routing information for IP termination 60 of logical MGW 50 is provided and assigned as part of the C2 context to IP termination 62; another IP termination 66 is requested to be assigned for two-way communications with IP termination 62; IP termination 64 is requested to receive one-way communications from IP termination 62; IP termination 66 is requested to receive one-way communications from IP termination 66. In step 116, MSC 20 sends route information to MGW 50 by providing the IP address and port information for IP termination 62 which is coupled for two-way communications with IP termination 60.

In step 118 the MSC 20 requests a new context, C3, at logical MGW 56 (PSTN MGW 32) to establish a TDM termination 72 to receive one-way communications from an IP termination 70 that will be coupled to IP termination 64 wherein the IP address and port assignment associated with IP termination 64 is provided to MGW 56 for association with IP termination 70. In step 120 the MSC 20 requests a new context, C4, at logical MGW 56 to establish another TDM termination 76 to receive one-way communications from an IP termination 74 wherein the IP address and port assignment associated with IP termination 68 is provided to MGW 56 for association with IP termination 74. In response to the request for each new context C3 and C4, logical MGW 56 returns a transaction reply to MSC 20 that includes the context identification and associated addresses and ports for the newly created terminations. In step 122 the MSC 20 sends routing information to MGW 52 providing the addressing of IP termination 70 to be associated with IP termination 64, and the addressing of IP termination 74 to be associated with IP termination 68.

In step 124 the MSC 20 forwards the call request to MSC 26, the terminating MSC for subscriber 22. The MSC 26 makes a query of the HLR to obtain the MSRN of subscriber 22 in step 126 and determines that the subscriber 22 is available (active) to receive the call. This information is conveyed to MSC 20 wherein a request for a new context, C5, at MGW 54 is made in step 128. This request seeks the assignment of two terminations: an IP termination 78 and a TDM termination 80 that will support communications with a telephone 22. The request also includes addressing information for IP termination 66 to facilitate communications with IP termination 78. Two-way communications are supported between terminations 78 and 80. The MSC 20 receives a transaction reply from MGW 54 providing the termination addresses and ports associated with terminations 78 and 80. In step 130 MSC 20 sends routing information to MGW 52 that includes the IP addressing and port of IP termination 78 to be utilized in conjunction with IP termination 66 for communications there between.

In step 132 a traffic channel is enabled from subscriber 10 to subscriber 22. Two-way TDM communications are supported for subscriber 10 and subscriber 22 by TDM termination 58 and 80, respectively. The TDM terminations 58 and 80 are coupled by IP terminations 60, 62, 66, and 78.

The call is established with typical call setup messages at step 134. For example, a call connect alerting message is transmitted by telephone 22 that is relayed by the MSC to telephone 10. An audible ringing tone may be transmitted to telephone 10 that ends upon the called party (subscriber 22) answering which causes a connect message to be relayed to the MSC. The MSC generates a connect message to telephone 10. Upon the MSC receiving a connect acknowledgment from telephone 10 and telephone 22, the previously established communication path (bearer path) between telephones 10 and 22 is enabled at step 134. Also, concurrent communications generated by subscribers 10 and 22 are relayed to CCDU 38 by one-way TDM terminations 72 and 76, respectively, in step 136. The call connection process terminates at END 138.

TDM terminations 72 and 76 are connected to dedicated trunks assigned for wire tapping the wire tape party implemented by the service provider pursuant to a request of the law enforcement agency. CCDU 38 records communications incoming and outgoing relative to the wiretap party via these dedicated trunks.

It will be apparent to those skilled in the art based on the description of the above embodiment that the present invention is not limited to the specific call request described. For example, the logical diagram shown in FIG. 2 is also suited for supporting a wiretap between a calling and a called party where one of these parties is subject to monitoring even if call forwarding is not utilized. A wiretap of a three-way or conference call can also be accommodated in a similar manner by establishing three concurrent 1-way communication channels routed to law enforcement authorities in a similar manner explained with regard to FIG. 2. Although three mobile switching centers are shown in FIG. 1, it will be apparent that subscribers 10, 16 and 22 could all the supported by a single MSC. The logical media gateways 50, 52 and 54 could be implemented more than one physical media gateway.

Assuming a media gateway is available with the required types of terminations, a single media gateway could be utilized to implement all of the logical media gateways illustrated in FIG. 2. The calling and called party subscribers may utilize wireless services, wireline services, or a combination of these services. Although the intelligence associated with controlling and establishing the logical media gateways is illustrated in the current example as residing in the terminating MSC of the monitored party, this intelligence can be distributed to more than one node or transferred to a different intelligent node. If desired, the wiretap communications concurrently delivered to the law enforcement authority line can be in a format other than traditional TDM communications, e.g. IP packets. Although the internal communication paths within the media gateway are described as using IP packets, it will be apparent that other communication protocols could be utilized. Also the external communication ports provided by the media gateway could be other than TDM protocol depending on the protocol employed in the subject telecommunication network, e.g. ATM ports would be used to support ATM channels.

Although an embodiment of the present invention has been described above and shown in the drawings, the scope of the invention is defined by the claims that follow.

We claim:

1. A method for providing wiretap services in a telecommunication network where communications involving a wiretap party are to be monitored, the method comprising the steps of:

receiving at an intelligent node in the network a call request in which a party to the call request is the wiretap party;

establishing first, second, third and fourth terminations at a media gateway on a per call basis, the first and fourth terminations comprising one type of protocol termination and the second and third terminations supporting another communication protocol, coupling the first and second terminations together to provide two-way communications there between and coupling the third and fourth terminations together to provide two-way communications there between;

coupling the terminations of the first and fourth terminations to communication channels coupled to a calling party and a terminating party, respectively;

establishing on a per call basis fifth, sixth, seventh and eighth terminations utilizing the another communication protocol;

coupling together the fifth and sixth terminations, the fifth and second terminations, and the sixth and third terminations to support two-way communications there between;

coupling together the fifth and seventh terminations, and the sixth and eighth terminations, where the fifth and sixth terminations support one-way communications transmitted to the seventh and eighty terminations, respectively, from the first and fourth terminations, respectively;

transmitting communications received by the seventh and eighth terminations to a line being monitored for the wiretap;

whereby two-way communications between the calling and terminating parties is provided, and one-way communications from the calling party and the terminating party are provided to the line being monitored for the wiretap.

2. The method according to claim 1 wherein the transmitting step comprises:

establishing ninth, tenth, eleventh and twelfth terminations at the media gateway on a per call basis, the tenth and twelfth terminations comprising the one type of protocol terminations and the ninth and eleventh terminations supporting the another communication protocol;

coupling together the ninth and tenth terminations, and the eleventh and twelfth terminations for one-way communications to the tenth and twelfth terminations, respectively;

coupling together the seventh and ninth terminations, and the eighth and eleventh terminations for one-way communications to the ninth and eleventh terminations;

coupling outputs from the tenth and twelfth terminations to the line being monitored for the wiretap.

3. The method according to claim 1 further comprising the step of determining whether wiretap processing is required based on whether a party to the call is the wiretap party.

4. The method according to claim 1 further comprising the step of issuing control instructions from an intelligent node handling the call request involving the wiretap party, said control instructions being directed to the media gateway wherein the media gateway responds as directed by the control instructions to establish terminations on a per call basis.

5. A method for providing wiretap services in a media gateway where communications involving a wiretap party are to be monitored, the method comprising the steps of:

receiving instructions from an intelligent node associated with handling a call involving the wiretap party and in response to the received instructions:

establishing first, second, third and fourth terminations on a per call basis, the first and fourth terminations comprising one type of protocol termination and the second and third terminations supporting another communication protocol, coupling the first and second terminations together to provide two-way communications there between and coupling the third and fourth terminations together to provide two-way communications there between;

coupling the terminations of the first and fourth terminations to communication channels coupled to a calling party and a terminating party, respectively;

establishing on a per call basis fifth, sixth, seventh and eighth terminations utilizing the another communication protocol;

coupling together the fifth and sixth terminations, the fifth and second terminations, and the sixth and third terminations to support two-way communications there between;

coupling together the fifth and seventh terminations, and the sixth and eighth terminations, where the fifth and sixth terminations support one-way communications transmitted to the seventh and eighty terminations, respectively, from the first and fourth terminations, respectively;

transmitting communications received by the seventh and eighth terminations to a line being monitored for the wiretap;

whereby two-way communications between the calling and terminating parties is provided, and one-way communications from the calling party and the terminating party are provided to the line being monitored for the wiretap.

6. The method according to claim 5 wherein the transmitting step comprises:

establishing ninth, tenth, eleventh and twelfth terminations on a per call basis, the tenth and twelfth terminations comprising the one type of protocol terminations and the ninth and eleventh terminations supporting the another communication protocol;

coupling together the ninth and tenth terminations, and the eleventh and twelfth terminations for one-way communications to the tenth and twelfth terminations, respectively;

coupling together the seventh and ninth terminations, and the eighth and eleventh terminations for one-way communications to the ninth and eleventh terminations;

coupling outputs from the tenth and twelfth terminations to the line being monitored for the wiretap.

* * * * *